(12) United States Patent
Maki et al.

(10) Patent No.: US 7,190,493 B2
(45) Date of Patent: Mar. 13, 2007

(54) IMAGE READING APPARATUS AND IMAGE READING METHOD

(75) Inventors: Yoichiro Maki, Nagano (JP); Noriyuki Noda, Nagano (JP); Takeshi Aoki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 919 days.

(21) Appl. No.: 10/241,311

(22) Filed: Sep. 10, 2002

(65) Prior Publication Data

US 2003/0072495 A1 Apr. 17, 2003

(30) Foreign Application Priority Data

Sep. 12, 2001 (JP) ............................ P2001-276555

(51) Int. Cl.
*H04N 1/40* (2006.01)
*H04N 1/04* (2006.01)
*H04N 1/00* (2006.01)

(52) U.S. Cl. ...................... 358/461; 358/445; 358/406; 358/482; 358/483; 358/474; 358/487; 358/497; 358/504; 358/506; 358/512; 358/513; 358/514; 382/274

(58) Field of Classification Search ................ 358/445, 358/446, 516, 406, 504, 461, 474, 444, 404, 358/443, 483, 482, 512–514, 487, 506, 497; 382/274, 312, 318, 319, 162; 399/207

See application file for complete search history.

(56) References Cited

U.S. PATENT DOCUMENTS

| 5,317,421 A | * | 5/1994 | Ito .............................. 358/464 |
| 5,371,613 A | * | 12/1994 | Arimoto et al. ............ 358/461 |
| 5,920,656 A | * | 7/1999 | Gahang ....................... 382/274 |
| 6,891,648 B2 | * | 5/2005 | Inoue et al. ................. 358/516 |

FOREIGN PATENT DOCUMENTS

| JP | 61-295763 | 12/1986 |
| JP | 09-037086 | 2/1997 |

* cited by examiner

*Primary Examiner*—Cheukfan Lee
(74) *Attorney, Agent, or Firm*—John J. Penny, Jr.; Edwards Angell Palmer & Dodge LLP

(57) ABSTRACT

A white reference image is inputted to an image sensor so as to output groups of analog data. The groups of analog data are converted by a processing unit into those groups of digital data the number of which is smaller than that of photosensor elements of the image sensor. The lowest density value of the groups or digital data is inspected, an operating environment is set so that the lowest density value of the groups of digital data may become a density value within a predetermined range. An optical system, a drive unit and the processing unit are controlled under the operating environment so as to output from the processing unit, image data which express a subject image inputted to the image sensor.

14 Claims, 5 Drawing Sheets

IMAGE READING APPARATUS AND IMAGE READING METHOD

The present application claims priority from JP2001-276555 filed on Sep. 12, 2001, which is hereby incorporated by reference in its entirety.

BACKGROUND OF THE INVENTION

The present invention relates to an image reading apparatus, and an image reading method.

In general, in an image reading apparatus, an operating environment is adjusted beforehand lest the density value of image data to be outputted should exceed a predetermined range. Concretely, the lowest density value is inspected as to white reference digital data which is acquired by reading the optical image (white reference image) of a white reference plate or the like, and the operating environment is adjusted so that the lowest density value may become a density value within the predetermined range. Incidentally, the "lowest density value" shall signify a value which expresses "being the lightest", among density values expressive of light and shade. The operating environment to be adjusted is set depending upon the luminous intensity of a light source for illuminating an original, the accumulation time of the signal charges of photosensor elements in an image sensor, the gain of groups of analog data outputted from the image sensor, and so forth. It is assumed by way of example that the predetermined range of density values be 30–240 in digital data of 256 gradations from 0 to 255 as are outputted from an A/D converter of 8-bit resolution. On this occasion, in a case where the white reference digital data is inspected by reading the white reference plate and where any pixel whose density value exceeds 240 exists, the operating environment for the image sensor, an analog signal processing unit, etc. is set by adjusting the luminous intensity, an exposure time, the gain of the groups of analog data, etc. so as to lower the density value.

With the enhancement of a resolution, the number of photosensor elements in an image sensor has increased steadily, and a time period which is required for a process for converting groups of analog data outputted as to all the elements, into groups of digital data, and a process for detecting the lowest density value from the groups of the resulting digital data, has lengthened. This bring the problem that a time period which is required for setting an operating environment before the start of the reading of an original image has lengthened.

SUMMARY OF THE INVENTION

The present invention has been created in order to solve the above problem, and has for its object to provide an image reading apparatus and an image reading method which shorten a time period required for setting an operating environment.

In order to solve the aforesaid object, the invention is characterized by having the following arrangement.

(1) An image reading apparatus comprising:

an image sensor including a plurality of photosensor elements;

an optical system for inputting an optical image to the image sensor;

a drive unit for driving the image sensor;

a processing unit for converting groups of analog data outputted from the image sensor, into groups of digital data, and outputting image data expressive of the optical image on the basis of the groups of digital data;

a white input unit for inputting a white reference image to the image sensor so as to output groups of analog data;

a conversion unit for causing the processing unit to convert the groups of analog data outputted from the white input unit, into the groups of digital data the number of which is smaller than that of the photosensor elements of the image sensor;

an inspection unit for inspecting a lowest density value of the groups of digital data;

a setting unit for setting an operating environment in which the lowest density value of the groups of digital data becomes a density value within a predetermined range; and a control unit for controlling the optical system, the drive unit and the processing unit under the operating environment, and for causing the processing unit to output image data which express a subject image inputted to the image sensor.

(2) The image reading apparatus according to (1), wherein the conversion unit causes the processing unit to convert into the groups of digital data smaller in number than the photosensor elements of the image sensor, the groups of analog data outputted as to a part of the photosensor elements arrayed rectilinearly in the image sensor which are discontinuously arrayed so as to interpose every predetermined number of remaining photosensor elements of the image sensor between the respectively adjacent ones of the discontinuously arrayed photosensor elements.

(3) An image reading apparatus according to (1), wherein the image sensor includes the plurality of photosensor elements which are arrayed in a plurality of rows forming the parallel lines; and the conversion unit causes the processing unit to convert into the groups of digital data smaller in number than the photosensor elements of the image sensor, the groups of analog data outputted as to a part of the photosensor elements of the image sensor which are discontinuously arrayed in each of the plurality of rows so as to interpose every predetermined number of remaining photosensor elements of the image sensor between the respectively adjacent ones of the discontinuously arrayed photosensor elements.

(4) The image reading apparatus according to (1), wherein the groups of digital data correspond to groups of mean values obtained every predetermined number of analog data.

(5) The image reading apparatus according to (1), wherein the groups of digital data correspond to groups of maximum values obtained every predetermined number of analog data.

(6) The image reading apparatus according to (1), wherein the setting unit sets the operating environment by adjusting amplification of the analog data which are outputted from said image sensor.

(7) The image reading apparatus according to (1), wherein setting unit sets the operating environment by adjusting an accumulation time of signal charges of the photosensor elements.

(8) An image reading method comprising:

a white input step of inputting a white reference image to an image sensor so as to output groups of analog data;

a conversion step of converting the groups of analog data into groups of digital data the number of which is smaller than that of photosensor elements of the image sensor;

a inspection step of inspecting a lowest density value of the groups of digital data;

a setting step of setting an operating environment in which the lowest density value of the groups of digital data becomes a density value within a predetermined range; and a output step of inputting a subject image to the image sensor under the operating environment, converting analog data outputted from the image sensor, into digital data, and outputting image data expressive of the subject image on the basis of the resulting digital data.

(9) The image reading method according to (8), wherein at the conversion step, the groups of analog data outputted as to a part of the photosensor elements arrayed rectilinearly in the image sensor which are discontinuously arrayed so as to interpose every predetermined number of remaining photosensor elements of the image sensor between the respectively adjacent ones of the discontinuously arrayed photosensor elements, are converted into the groups of digital data the number of which is smaller than that of the photosensor elements of the image sensor.

(10) The image reading method according to (8), wherein the image sensor includes the plurality of photosensor elements which are arrayed in a plurality of rows forming parallel lines; and at the conversion step, the groups of analog data outputted as to a part of the photosensor elements of the image sensor which are discontinuously arrayed in each of the plurality of rows so as to interpose every predetermined number of remaining photosensor elements of the image sensor between the respectively adjacent ones of the discontinuously arrayed photo sensor elements, are converted into those groups of digital data the number of which is smaller than that of the photosensor elements of the image sensor.

(11) The image reading method according to (8), wherein the groups of digital data correspond to groups of mean values obtained every predetermined number of analog data.

(12) The image reading method according to (8), wherein the groups of digital data correspond to groups of maximum values obtained every predetermined number of analog data.

(13) The image reading method according to (8), wherein, at the setting step, the operating environment is set by adjusting amplification of the analog data which are outputted from the image sensor.

(14) The image reading method according to (8), wherein at the setting step, the operating environment is set by adjusting an accumulation time of signal charges of the photosensor elements.

DETAILED DESCRIPTION OF PREFERRED EMBODIMENTS

Now, the construction of an image scanner 10 which is an embodiment of an image reading apparatus according to the present invention will be described with reference to FIGS. 2 and 3.

Figure 2:
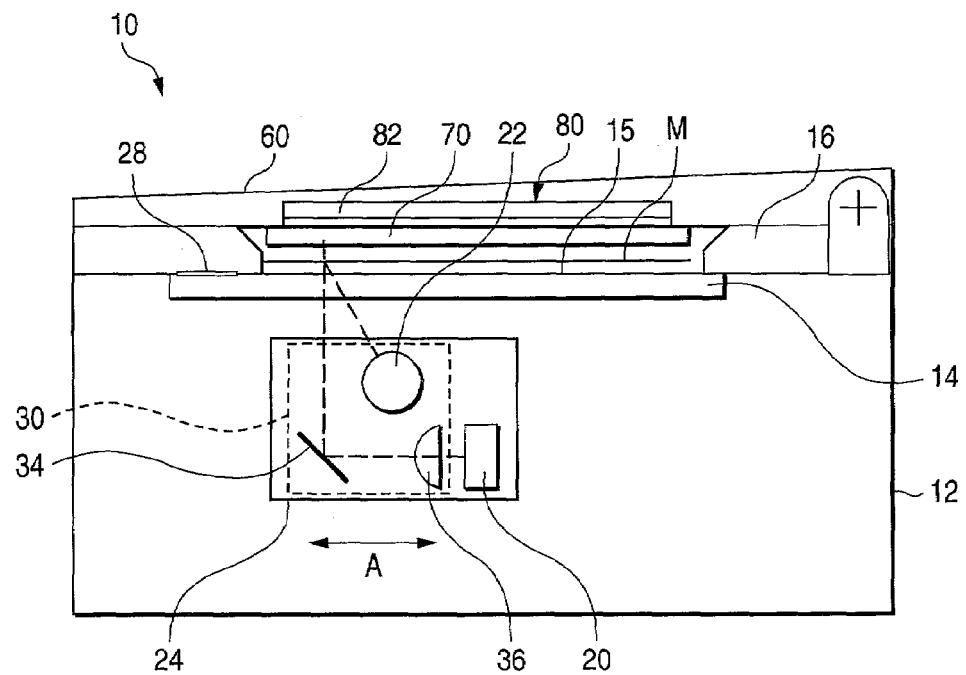
FIG. 2 is a sectional view schematically showing an image scanner 10 embodying the present invention.

FIG. 2 is a schematic view showing the image scanner 10 as one embodiment of the image reading apparatus according to the present invention. The image scanner 10 is of so-called "flatbed type" which includes an original table 14 at the top of a body 12 of rectangular parallelepiped.

The original table 14 is formed of a substantially rectangular transparent plate such as glass plate, and a subject M such as photographic film, photograph or printed document is put on the surface 15 of the original table 14. An original guide 16 which is in the shape of a substantially rectangular frame, is joined to the peripheral edge part of the original table 14. The original guide 16 abuts against the subject M, and positions the subject M onto the surface 15 of the original table 14. A white reference plate 28 which extends in a main scanning direction, is joined to the original guide 16. The white reference plate 28 has a uniform reflection surface of high reflectivity.

An original cover 60 is pivotally coupled to the body 12. The original cover 60 holds the subject M put on the original table 14, and it conceals the original table 14 in order that light other than the emission light of a light source 22 for a reflective original or a light source 80 for a transmissive original may be prevented from illuminating the subject M. An original mat 70 is detachably attached in engagement with the original cover 60. The original mat 70 is attached to the original cover 60 in case of reading the reflective original, whereas it is detached from the original cover 60 in case of reading the transmissive original. The original mat 70 has its shape and mounting position set so as to conceal a light diffusion plate 82 when it is attached to the original cover 60, and to expose the light diffusion plate 82 when it is detached from the original cover 60.

The transmissive-original light source 80 is accommodated in the original cover 60. This transmissive-original light source 80 is configured of a tubular illumination device such as fluorescent tube lamp, the light diffusion plate 82 and a reflection plate. The tubular illumination device not shown is mounted on the original cover 60 in an attitude in which the longitudinal axis thereof extends in parallel with the reciprocating direction of a carriage 24. The light diffusion plate 82 is made of a semitransparent, light guide plate of substantially rectangular shape being parallel to the pivotal axis of the original cover 60, and it diffuses and transmits light falling thereon from the tubular illumination device or the reflection plate. The reflection plate not shown is formed in the shape of a sheet curved like a semi-tube, and it is mounted on the original cover 60 in an attitude in which the longitudinal axis thereof is parallel to that of the tubular illumination device. This reflection plate reflects the emission light of the tubular illumination device toward the light diffusion plate 82. The transmissive original such as photographic film is illuminated by the transmissive-original light source 80. Thus, it is permitted to scan the transmissive original.

The carriage 24 is accommodated in the body 12 so as to freely reciprocate in parallel with the surface 15 of the original table 14. An optical system 30 and an image sensor 20 are provided in the carriage 24. The carriage 24 is pulled by, for example, a belt so as to transport the image sensor 20 and the optical system 30 in the direction A in FIG. 2.

The optical system 30 is configured of the reflective-original light source 22, a mirror 34, a condensing lens 36, etc. The reflective-original light source 22 is constructed of a tubular illumination device such as fluorescent tube lamp. This reflective-original light source 22 is provided in the carriage 24 in an attitude in which the longitudinal axis thereof extends in parallel with that of the image sensor 20. As indicated by broken lines in FIG. 2, a reflected light image on the main scanning line of the subject M illuminated by the reflective-original light source 22 and/or a transmitted light image on the main scanning line of the subject M illuminated by the transmissive-original light source 80 are/is focused on the image sensor 20 by the mirror 34 and the condensing lens 36.

Figure 3:
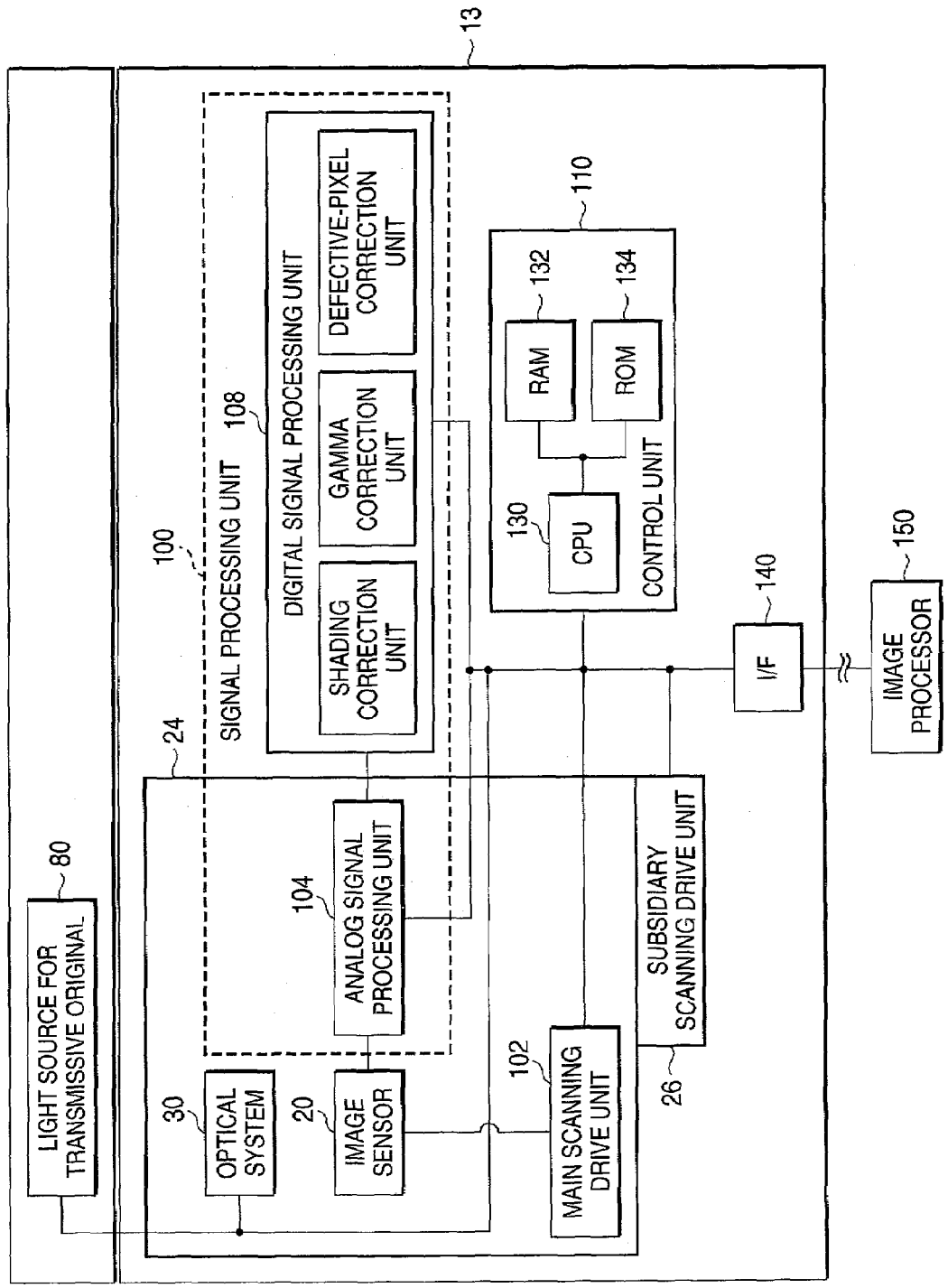
FIG. 3 is a block diagram showing the image scanner 10 embodying the present invention.

FIG. 3 is a block diagram showing the image scanner 10.

A main scanning drive unit 102 is provided in the carriage 24. The main scanning drive unit 102 is a drive circuit which supplies the image sensor 20 with shift pulses, transfer pulses necessary for driving the image sensor 20. This main scanning drive unit 102 is constructed of, for example, a synchronizing signal generator or a driving timing generator. The main scanning drive unit 102 is provided with a register for setting an interval between outputs of the shift pulses, so that the interval between the outputs of the shift pulses can be changed by setting a value of the register.

A subsidiary scanning drive unit 26 is configured of the belt held in engagement with the carriage 24, a motor and a gear train for rotating the belt, a drive circuit, etc., and it is accommodated in the body 12. The subsidiary scanning drive unit 26 pulls the carriage 24 by the belt, whereby the main scanning line extending perpendicularly to the sheet of drawing as viewed in FIG. 2 is moved in the direction A perpendicular thereto. It is therefore permitted to scan a two-dimensional image.

Figure 4:
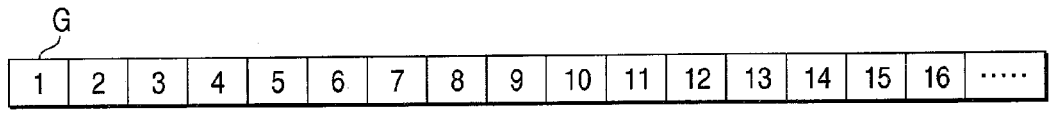
FIG. 4 is a schematic diagram showing a situation where photo sensor elements G are arrayed in one row in the image sensor 20.
Figure 5:
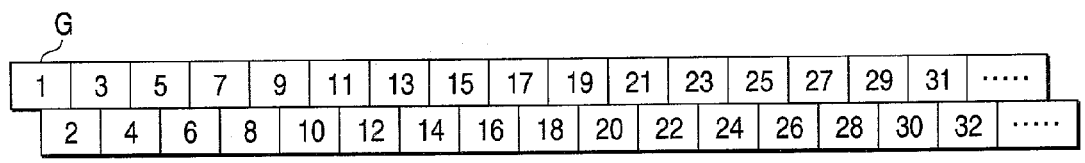
FIG. 5 is a schematic diagram showing a situation where photosensor elements G are arrayed in a plurality of rows in the shape of parallel lines in the image sensor 20.

The image sensor 20 includes a plurality of photosensor elements such as photodiodes, shift gates, analog shift registers, and charge voltage conversion units. This image sensor 20 is a linear image sensor provided in the carriage 24 in an attitude in which the photosensor elements are arrayed rectilinearly in a direction perpendicular to the sheet of drawing as viewed in FIG. 2. In case of color outputs, the image sensor 20 employs color filter arrays of three colors R (Red), G (Green) and B (Blue), and it has a 3-row configuration in which each color forms one row (1 row×3 colors) or a 6-row configuration in which each color forms 2 rows (2rows×3 colors). FIG. 4 is a schematic diagram showing a situation where the photosensor elements G are arrayed in one row in the image sensor 20. FIG. 5 is a schematic diagram showing a situation where the photosensor elements G are arrayed in a plurality of rows in the shape of parallel lines, and it shows the photosensor elements G in 2 rows corresponding to pixels for one line. In the image sensor 20, the analog shift register for transferring charges from the odd-numbered photosensor elements, and the analog shift register for transferring charges from the even-numbered photosensor elements are constructed of different analog shift registers. The image sensor 20 scans the optical image on the main scanning line as inputted by the optical system 30, and it outputs analog data correlative to the density of the optical image. More specifically, the image sensor 20 accumulates for a certain time period, charges which are obtained through the photoelectric conversion of light of predetermined wavelength region, such as visible radiation, infrared radiation or ultraviolet radiation, and it outputs groups of electric signals of analog expression (analog data) corresponding to the quantities of light received by the respective photosensor elements, in time-division fashion by employing CCDs (Charge Coupled Devices), MOS transistor switches or the likes. Either a lens reduction type or a contact type may be employed as the image sensor 20.

The image sensor 20 operates as follows:

(1) When light is received by each photosensor element, charges are accumulated in the photosensor element by photoelectric conversion.

(2) The charges accumulated in the photosensor elements are transferred to the analog shift registers in such a way that shift pulses are inputted to the shift gates by the main scanning drive unit 102. The transfer of the charges is simultaneously performed for all the photosensor elements. A time period for which the charges are accumulated in the photosensor elements, that is, an exposure time can be altered by changing the pulse intervals of the shift pulses or manipulating an electronic shutter.

(3) The charges transferred to the analog shift registers are transferred to the charge voltage conversion units on the basis of transfer pulses to the analog shift registers as inputted by the main scanning drive unit 102.

A signal processing unit 100 is configured of an analog signal processing unit 104, and a digital signal processing unit 108. The signal processing unit 100 processes the output signals of the image sensor 20, and it outputs the image data expressive of the optical image inputted to the image sensor 20 by the optical system 30

The analog signal processing unit 104 is provided in the substrate which is fixed to the carriage 24. This analog signal processing unit 104 is an ASIC (Application Specific Integrated Circuit) which serves as a so-called "AFE (Analog Front End)" having a correlative dual sampling function, an amplification function, an offset function and an analog-to-digital conversion (A/D conversion) function. Thus, the analog signal processing unit 104 submits the analog signals outputted from the image sensor 20, to a noise reduction process, an amplification process, an offset process, etc. and thereafter submits the processed analog signals to A/D conversion, thereby to output image signals of digital expression (digital data) having a predetermined bit length. This analog signal processing unit 104 includes at its interface a gain register and an offset register which have a gain correction function and an offset correction function and serve to set a gain and an offset, respectively. Further, the unit 104 includes at its interface a mode register which serves to set an operation mode. More specifically, the analog signal processing unit 104 operates either in an operation mode for reading an original (original reading mode) or in an operation mode for setting an operating environment (operating environment setting mode), in accordance with a value set in the mode register. In the operating environment setting rode, the unit 104 outputs the digital data the number of which is smaller than that of the inputted analog data. In the original reading mode, it outputs the digital data the number of which is equal to that of the inputted analog data.

The digital signal processing unit 108 submits the digital data outputted from the analog signal processing unit 104, to various digital signal processes such as shading corrections, gamma corrections and pixel interpolations, thereby to create image data.

The control unit 110 is constructed of a microcomputer including a CPU 130, a RAM 132 and a ROM 134. This control unit 110 is connected to the main scanning drive unit 102, the subsidiary scanning drive unit 26, the reflective-original light source 22, the transmissive-original light source 80, the signal processing unit 100, etc. by buses. It runs computer programs stored in the ROM 134, thereby to control the main scanning drive unit 102, subsidiary scanning drive unit 26, reflective-original light source 22, transmissive-original light source 80, signal processing unit 100, etc. By way of example, a computer program for inspecting the lowest density value is stored in the ROM 134. The CPU 130 performs processes concerning the setting of the operating environment, such as a process for obtaining the lowest density value through the inspection of the groups of digital data by running this program.

Thus far, the construction of the image scanner 10 which is one embodiment of the image reading apparatus according to the present invention has been described with reference to FIGS. 2 and 3.

The setting of the operating environment is performed prior to the scanning of a subject image in order to enhance the quality of the image data which are outputted from the digital signal processing unit 108, by adjusting variables relevant to the density of the image data which are handled in the digital signal processing unit 108, such as the luminous intensity of the light source, the accumulation time of the signal charges of the photosensor elements in the image sensor, and the gain and offset of the analog signals outputted from the image sensor. The operating environment is set so that the lowest density value may become a density value within a predetermined range, by inspecting the lowest density value of white reference digital data which are acquired by reading the optical image (white reference image) of the white reference plate 28 or that of the diffusion plate 82 of the transmissive-original light source 80. In setting the environment, the lowest density value is inspected on the basis of the white reference digital data the number of which is smaller than that of the photosensor elements of the image sensor 20. The whole aspect of the flow of data in the setting of the operating environment will be described below.

Figure 6:
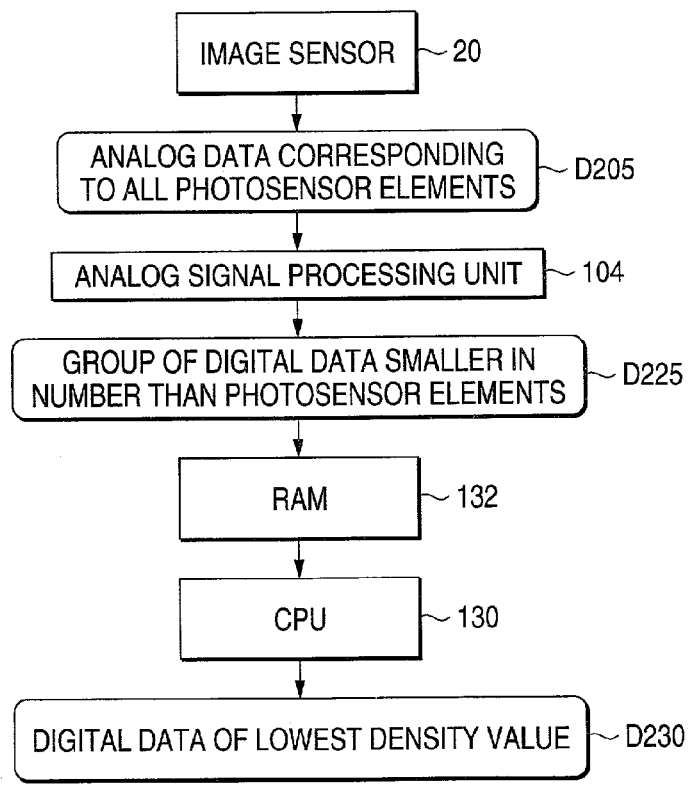
FIG. 6 is a chart showing the whole aspect of the flow of data in the setting of an operating environment.

FIG. 6 is a chart showing the whole aspect of the flow of data in the setting of the operating environment. First, analog data (D205) which correspond to all the photosensor elements having read the white reference image are outputted from the image sensor 20. The outputted data (D205) are converted by the analog signal processing unit 104 into those groups of digital data the number of which is smaller than that of the photosensor elements of the image sensor 20. The groups of data (D225) outputted from the analog signal processing unit 104 are once stored in the RAM 132 here. Thereafter, the CPU 130 inspects the lowest density value and outputs the digital data (D230) of the lowest density value.

The whole aspect of the flow of data in the setting of the operating environment has been described above. There will now be described the conversion process which the analog signal processing unit 104 performs for the purpose of outputting the digital data to be inspected in the operating environment setting mode.

The analog signal processing unit 104 combines a pre-stage process for extracting only the data of the preset ones of the photosensor elements, and a post-stage process for obtaining the mean value every predetermined number of extracted data, thereby to finally output those groups of digital data the number of which is smaller than that of the photosensor elements of the image sensor 20. Incidentally, the pre-stage process and the post-stage process may well be executed at any of all the processing steps of the noise reduction process, amplification process, offset process, etc. which are performed in the analog signal processing unit 104. Besides, the pre-stage process and the post-stage process may well be executed by a circuit arrangement of either wired logic or program logic.

Figure 1:
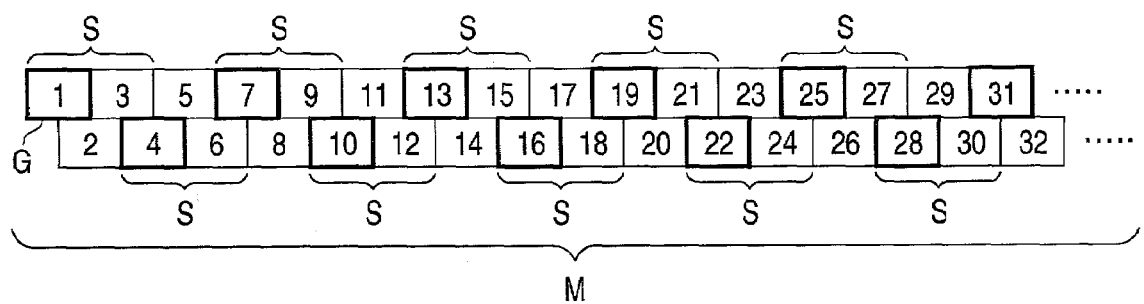
FIG. 1 is a schematic diagram showing an example in which photosensor elements to be extracted are set in an image sensor 20 of 6-row configuration (2 rows×3 colors) employing color filter arrays of three colors RGB.
Figure 7:
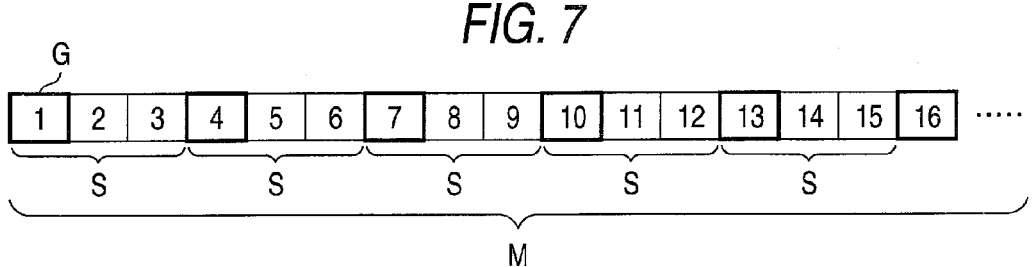
FIG. 7 is a schematic diagram showing an example in which photosensor elements to be extracted are set in an image sensor 20 of 3-row configuration (1 row×3 colors) employing color filter arrays of the three colors RGB.

In the pre-stage process, for the sake of convenience, each small interval is set from 3 photosensor elements which are adjacent in the image sensor 20, and only the element which lies at the left end of each small interval is set as an element to be extracted. FIG. 1 shows an example in which the photosensor elements G to be extracted are set in the image sensor 20 of the 6-row configuration (2 rows×3 colors) employing the color filter arrays of the 3 colors R (Red), G (Green) and B (Blue), so as to thin out the number of data to one-third. Incidentally, FIG. 1 shows only 2 rows corresponding to the photosensor elements G for one line, namely, 2 rows for one color. As shown in FIG. 1, the first, second and third photosensor elements G adjacent to one another constitute one small interval S, and the first element G lying at the left end is set as the element to be extracted. In this manner, some of the photosensor elements G of the image sensor 20 as are to be extracted (the first, fourth and seventh photosensor elements G, etc. enclosed with bold frames in the figure) are discontinuously arrayed in each of the plurality of rows so as to interpose two of the remaining elements G (the second, third and fifth photosensor elements G, etc.) between the respectively adjacent elements G to be extracted, whereby the photosensor elements G of each row can be evenly extracted. Besides, in the image sensor 20, the analog shift register for transferring the charges from the odd-numbered photosensor elements, and the analog shift register for transferring the charges from the even-numbered photosensor elements are constructed of the different analog shift registers. In general, different analog shift registers have different characteristics. Therefore, the discrepancy of the characteristics of the analog shift registers are minimized by evenly extracting the photosensor elements of the respective rows. Incidentally, FIG. 7 shows an example in which the photosensor elements G to be extracted are set in the image sensor 20 of the 3-row configuration (1 row×3 colors) employing the color filter arrays of the 3 colors RGB, and it shows only one of 3 rows.

Incidentally, regarding the setting of the photosensor elements to be extracted in the pre-stage process, these photosensor elements may be set evenly or uniformly in the main scanning direction so as to interpose the predetermined number of photosensor elements between the respectively adjacent elements to be extracted as in this embodiment. However, in a case, for example, where the luminous intensity distribution of the light source is always higher near the middle of the main scanning direction, the outputs of the photosensor elements near the middle of each row become larger in the image sensor 20, and hence, all the photosensor elements near the middle of each row may well be set as the elements to be extracted. Likewise, in a case where the luminous intensity distribution of the light source is always higher at the right end or left end of the main scanning direction, the photosensor elements in a predetermined number as reckoned from the right end or left end of each row may well be set as the elements to be extracted. That is if the characteristics of the light source are substantially constant at all times, the photosensor elements to be extracted may well be set considering the characteristics.

Besides, when the number of the elements to be extracted is decreased, a time period required for the inspection of the lowest density value is shortened, but the reliability of an inspected result lowers. To the contrary, when the number of elements to be extracted is increased, the time period required for the inspection lengthens, but the reliability of the inspected result rises. Therefore, the number of the elements to be extracted may be appropriately set in accordance with conditions, such as a performance and a quality which are required of the image reading apparatus.

In the post-stage process, a mean value is obtained every predetermined number as to the data extracted by the pre-stage process. Concretely, referring to FIG. 1, the mean value is obtained for the data extracted as to every ten of the small intervals S, whereby one mean value is outputted every medium interval M including the ten small intervals S. In the case of the example in FIG. 1, the number of data is further decreased to one-tenth by executing the post-stage process.

Incidentally, when the number of populations for which the respective mean values are obtained increases, that is, when the number of the small intervals S which are included in the medium interval M increases, the total number of the mean values decreases. Thus, the time period for the inspection of the lowest density value is shortened, but the reliability of the lowest density value lowers. Contrariwise, decrease in the number of the small intervals S included in the medium interval M results in prolonging the time period for the inspection of the lowest density value, but the reliability of the lowest density value rises. Therefore, the number of the small intervals S included in the medium interval M may be set at will in accordance with the conditions, such as the performance and the quality which are required of the image reading apparatus. Incidentally, it has been experimentally revealed that a result which is obtained by extracting the one-third data in the pre-stage process, obtaining the mean value every 32 data in the post-stage process, and inspecting the lowest density value on the basis of such mean values, comes to have a sufficiently high reliability by setting an appropriate tolerance for the inspected result of the lowest density value.

Besides, the time period for the inspection of the lowest density value can be shortened still further in such a way that, in the post-stage process of the analog signal processing unit 104, the maximum value of every predetermined number of data is obtained instead of the processing for obtaining the mean value of every predetermined number of data, thereby to increase the number of populations for which such maximum values are obtained. In the case of obtaining the maximum value of each population, the lowest density value in the populations can be precisely obtained at all times irrespective of the number of the populations of the maximum values, and the tolerance which is set for the inspected result of the lowest density value can be made smaller.

Thus far, there has been described the conversion process which the analog signal processing unit 104 performs for the purpose of outputting the digital data to-be-inspected. Now, the operation of setting the operating environment by the image scanner 10 will be described by taking the case of a reflective original as an example.

Figure 8:
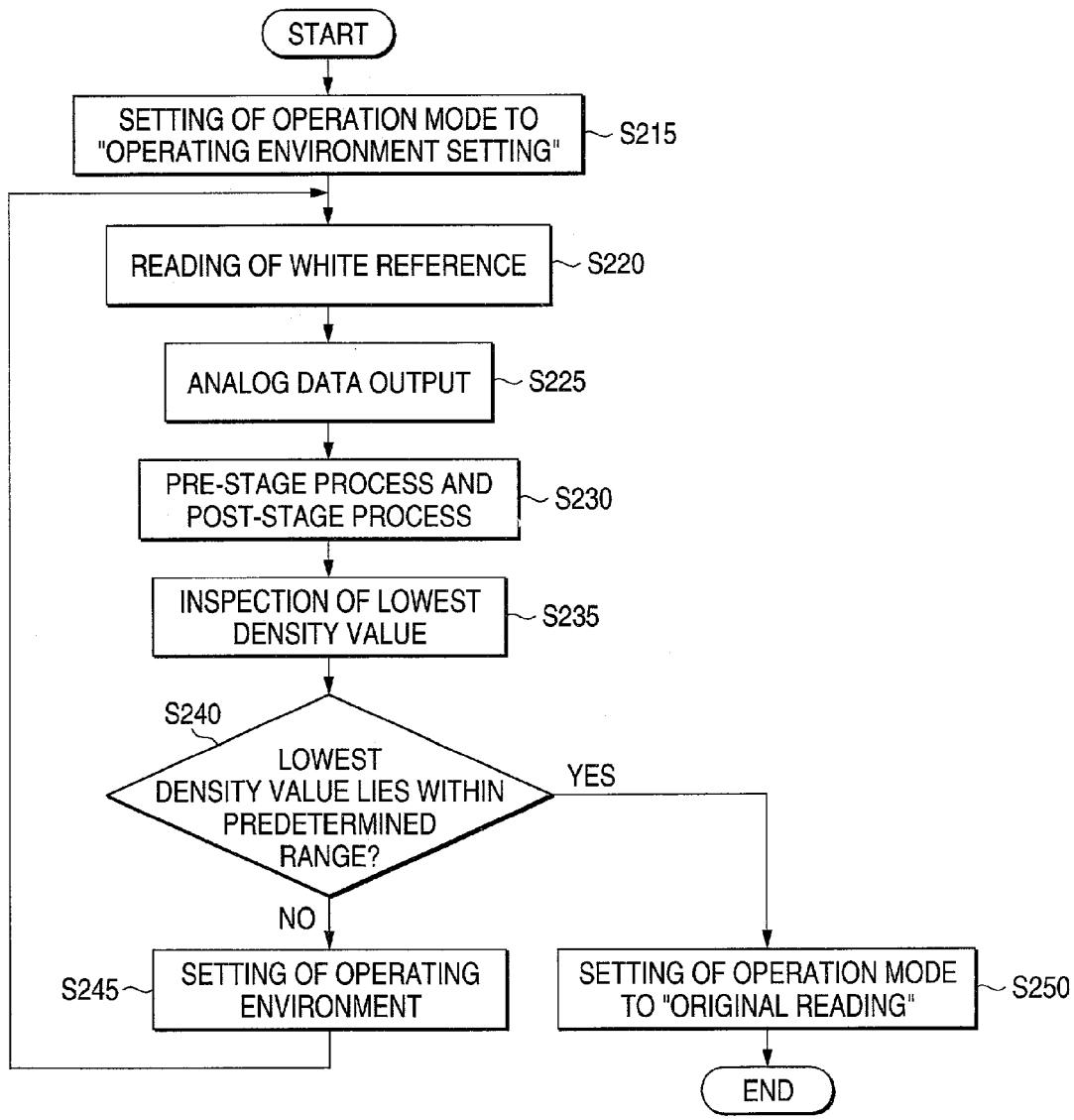
FIG. 8 is a chart showing the processing sequence of the operation of setting the operating environment.

FIG. 8 is a chart showing the processing sequence of the operation of setting the operating environment. The sequence is started by the turn-ON of the power source of the image scanner 20, and proceeds as follows:

(1) The CPU 130 sets a predetermined value expressive of the operating environment setting mode in the mode register included in the analog signal processing unit 104 (step S215).

(2) The CPU 130 lights up the reflective-original light source 22, and it controls the subsidiary scanning drive unit 26 so as to move the carriage 24 to a predetermined white reference reading position. Thus, the white reference image of the white reference plate 28 disposed at the edge part of the original table 14 is focused on the image sensor 20 by the optical system 30 (step S220).

(3) Charges (signal charges) in quantities correlative to entering light quantities are accumulated in the photosensor elements of the image sensor 20, and the accumulated charges are outputted to the analog signal processing unit 104 as the groups of analog data (D205) by shift pulses or the like drive pulses outputted from the main scanning drive unit 102 (step S225), (4) Since the value expressive of the operating environment setting mode is set in the register of the operation mode, the analog signal processing unit 104 performs the conversion process for outputting the digital data to be inspected as stated before, and it outputs the groups of digital data (D225) corresponding to the mean values obtained by the post-stage process. The number of the groups of digital data is smaller than that of the photosensor elements. The groups of digital data (D225) are stored at the predetermined addresses of the RAM 132 (step S230)

(5) The CPU 130 inspects the groups of digital data stored at the predetermined addresses of the RAM 132, and it detects the maximum density value in the data forming the groups, as the lowest density value in the operating environment. Incidentally, the maximum value can be easily obtained by, for example, successively comparing the data forming the respective groups of digital data and successively holding the data of greater values (step S235).

(6) The CPU 130 decides if the lowest density value obtained is a density value within a predetermined range (step S240).

(7) If the lowest density value is not the density value within the predetermined range, the operating environment is set so as to bring the lowest density value into the predetermined range, and the lowest density value is inspected again. Concretely, the CPU 130 performs the processing of adjusting the luminous intensity of the reflective-original light source 22 for illuminating the original, setting a value for designating the intervals of the shift pulses, in the predetermined register of the main scanning drive unit 102, and altering the value of the gain register or offset register of the analog signal processing unit 104 (step S245).

(8) If the lowest density value is the density value within the predetermined range, the operation mode of the A/D converter is set to the original reading mode, and the operation of setting the operating environment is ended (step S250).

Incidentally, the setting of the operating environment may well be performed each time an original is to be read. Besides, although the CPU 130 performs the inspection of the lowest density value in this embodiment, a circuit for inspecting the lowest density value may well be disposed so as to perform the inspection. Regarding the method of obtaining the lowest density value, the digital data to be inspected for obtaining the lowest density value may be obtained either by the combination of the extraction and the averaging as in this embodiment or by the processing of only one of the extraction and the averaging.

Thus far, the setting of the operating environment in this embodiment has been described. Now, there will be described the operation of inputting the subject image to the image sensor 20 under the set operating environment and outputting the image data.

Figure 9:
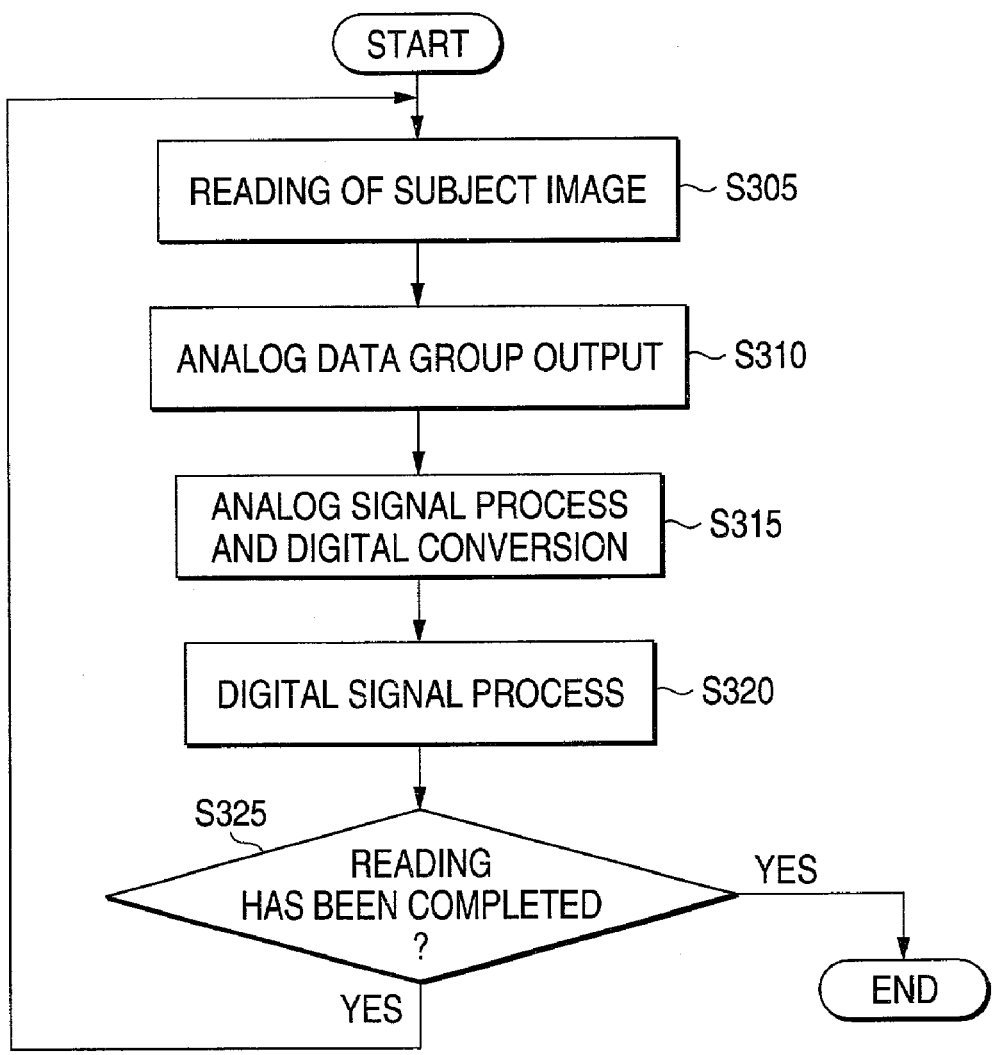
FIG. 9 is a chart showing the processing sequence of the operation of inputting a subject image and outputting image data.

FIG. 9 is a chart showing the processing sequence of the operation of inputting the subject image and outputting the image data. The processing sequence is started upon receiving an instruction for reading a subject, from the image processor 150.

(1) The CPU 130 lights up the reflective-original light source 22, and it controls the subsidiary scanning drive unit 26 so as to move the carriage 24 to a predetermined subject reading position. Thus, the subject image is focused on the image sensor 20 by the optical system 30 (step S305).

(2) Charges (signal charges) in quantities correlative to entering light quantities are accumulated in the photosensor elements of the image sensor 20, and the accumulated charges are outputted to the analog signal processing unit 104 as the groups of analog data by shift pulses or the like drive pulses outputted from the main scanning drive unit 102 (step S310).

(3) Since a value expressive of the original reading mode is set in the register of the operation mode, the analog signal processing unit 104 submits the outputted groups of analog data to the noise reduction process, amplification process, offset process, etc. and thereafter A/D-converts the processed groups of analog data, thereby to output groups of digital data having a predetermined bit length. The number of the groups of digital data is equal to that of the photosensor elements (step S315)

(4) The digital signal processing unit 108 submits the groups of digital data outputted from the analog signal processing unit 104, to various digital signal processes such as shading corrections, gamma corrections and pixel interpolations, and it outputs the resulting image data (step S320).

(5) The CPU 130 decides if the reading of the subject has been completed. If the reading has been completed, the CPU 130 ends the reading operation, and if not, it controls the subsidiary scanning drive unit 26 to move the carriage 24 in the subsidiary scanning direction, and the routine returns to the step S305 so as to read the next line (step S325).

Thus far, there has been described the operation of inputting the subject image to the image sensor 20 under the set operating environment and outputting the image data. The advantages of the image scanner 10 in this embodiment will be described below.

According to this embodiment, the inspection of the lowest density value is not performed as to all the photosensor elements, but it is performed as to only the elements arrayed in accordance with predetermined rules. The most important factor for the fact that the density value of the white reference digital data differs every photosensor element, is non-uniformity in illumination. Since, however, the influence of the nonuniform illumination is very slight between the adjacent photosensor elements, it is infrequent that the density value expressed by the white reference digital data changes abruptly. In obtaining the lowest density value, therefore, a value of high reliability can be obtained even when the inspection is performed by extracting some of the photosensor elements arrayed in the image sensor 20, every several elements. The total number of the digital data to be inspected for the lowest density value is made small by the process based on the dedicated hardware, thereby to shorten a time period required for the process for obtaining the lowest density value by the software. Accordingly, the setting of the operating environment can be done in a short time. Moreover, since the quantity of data processing in the analog data processing unit 104 is decreased, a time period required for the process for obtainig the lowest density value is shortened still further.

The advantages of the image scanner 10 in this embodiment have been described above. Incidentally, the method of converting the groups of analog data into those groups of digital data the number of which is smaller than that of the photosensor elements of the image sensor 20 may well be, for example, such that the number of data to be inputted to the analog data processing unit 104 is decreased in itself, or that the CPU 130 extracts some data to be inspected from the RAM 132 without decreasing the number of data by the analog data processing unit 104. Besides, this embodiment has been described by taking as the example the case where the reflective original such as paper is read by employing the image reading apparatus of flatbed type. The present invention, however, may well be applied to an image reading apparatus of sheet-feed type or to an image apparatus for reading the transmissive original such as film, unlike the reflective original.

Lastly, the corresponding relations between items stated in the appended claims and the points of this embodiment will be put in order and described below.

The "image sensor", "optical system", "drive unit" and "processing unit" stated in the claims correspond to the image sensor 20, optical system 30, main scanning drive unit 102 and signal processing unit 100 in this embodiment, respectively.

The function of the "white input unit" stated in the claims corresponds to the function (steps S220–S225) that the optical system 30 focuses the white reference plate 28 disposed in the original table 14, on the light receiving portion of the image sensor 20, whereupon the image sensor 20 outputs the groups of analog data on the basis of the focused image.

The function of the "conversion unit" stated in the claims corresponds to the function (step S230) that the analog signal processing unit 104 executes the pre-stage process and the post-stage process for the groups of analog data outputted from the image sensor 20, thereby to convert the groups of analog data into the digital data the number of which is smaller than that of the photosensor elements.

The function of the "inspection unit" stated in the claims corresponds to the function (step S235) that the CPU 130 inspects the lowest density value of the groups of digital data stored in the RAM 132.

The function of the "setting unit" stated in the claims corresponds to the function (step S245) that the CPU 130 adjusts the luminous intensity of the reflective-original light source 22, sets the value designating the intervals of the shift pulses, in the predetermined register of the main scanning drive unit 102, or alters the value of the gain register or offset register of the analog signal processing unit 104.

The function of the "control unit" stated in the claims corresponds to the series of functions (steps S305–S325) that the CPU 130 controls the optical system 30, main scanning drive unit 102, subsidiary scanning drive unit 26 and signal processing unit 100 so as to output the image data from the signal processing unit 100.

"a part of the photosensor elements of the image sensor as are discontinuously arrayed so as to interpose every predetermined number of remaining photosensor elements of the image sensor between the respectively adjacent ones of the discontinuously arrayed photosensor elements" as stated in the claims correspond to the photosensor elements set as the ones to-be-inspected in the image sensor 20 of 3-row configuration (1 row×3 colors).

"plurality of photosensor elements which are arrayed in a plurality of rows in the shape of parallel lines" as stated in the claims correspond to the photosensor elements which are arrayed in the image sensor 20 of 6-row configuration (2 rows×3 colors).

"a part of the photosensor elements of the image sensor as are discontinuously arrayed in each of a plurality of rows so as to interpose every predetermined number of remaining photosensor elements of the image sensor between the respectively adjacent ones of the discontinuously arrayed photosensor elements" as stated in the claims correspond to the photosensor elements set as the ones to-be-inspected in the image sensor 20 of 6-row configuration (2rows×3 colors).

The "groups of digital data corresponding to the groups of mean values obtained every predetermined number of analog data" as stated in the claims correspond to the groups of digital data (D225) of the mean values.

The function of "setting the operating environment by adjusting the amplification of the analog data outputted from the image sensor by the setting unit" as stated in the claims corresponds to the function (step S245) that the CPU 130 alters the value of the gain register or offset register of the analog signal processing unit 104.

The function of "setting the environment by adjusting the accumulation time of the signal charges of the photosensor elements by the setting unit" as stated in the claims corresponds to the function (step S245) that the CPU 130 sets the value for designating the intervals of the shift pulses, in the predetermined register of the main scanning drive unit 102.

What is claimed is:

1. An image reading apparatus comprising:
   an image sensor including a plurality of photosensor elements;
   an optical system for inputting an optical image to the image sensor;
   a drive unit for driving the image sensor;
   a processing unit for converting groups of analog data outputted from the image sensor, into groups of digital data, and outputting image data expressive of the optical image on the basis of the groups of digital data;
   a white input unit for inputting a white reference image to the image sensor so as to output groups of analog data;
   a conversion unit for causing the processing unit to convert the groups of analog data outputted from the white input unit, into the groups of digital data the number of which is smaller than that of the photosensor elements of the image sensor;
   an inspection unit for inspecting a lowest density value of the groups of digital data;
   a setting unit for setting an operating environment in which the lowest density value of the groups of digital data becomes a density value within a predetermined range; and
   a control unit for controlling the optical system, the drive unit and the processing unit under the operating environment, and for causing the processing unit to output image data which express a subject image inputted to the image sensor.

2. The image reading apparatus according to claim 1, wherein the conversion unit causes the processing unit to convert into the groups of digital data smaller in number than the photosensor elements of the image sensor, the groups of analog data outputted as to a part of the photosensor elements arrayed rectilinearly in the image sensor which are discontinuously arrayed so as to interpose every predetermined number of remaining photosensor elements of the image sensor between the respectively adjacent ones of the discontinuously arrayed photosensor elements.

3. An image reading apparatus according to claim 1, wherein
   the image sensor includes the plurality of photosensor elements which are arrayed in a plurality of rows forming the parallel lines; and
   the conversion unit causes the processing unit to convert into the groups of digital data smaller in number than the photosensor elements of the image sensor, the groups of analog data outputted as to a part of the photosensor elements of the image sensor which are discontinuously arrayed in each of the plurality of rows so as to interpose every predetermined number of remaining photosensor elements of the image sensor between the respectively adjacent ones of the discontinuously arrayed photosensor elements.

4. The image reading apparatus according to claim 1, wherein the groups of digital data correspond to groups of mean values obtained every predetermined number of analog data.

5. The image reading apparatus according to claim 1, wherein the groups of digital data correspond to groups of maximum values obtained every predetermined number of analog data.

6. The image reading apparatus according to claim 1, wherein the setting unit sets the operating environment by adjusting amplification of the analog data which are outputted from said image sensor.

7. The image reading apparatus according to claim 1, wherein setting unit sets the operating environment by adjusting an accumulation time of signal charges of the photosensor elements.

8. An image reading method comprising:
   a white input step of inputting a white reference image to an image sensor so as to output groups of analog data;
   a conversion step of converting the groups of analog data into groups of digital data the number of which is smaller than that of photosensor elements of the image sensor;
   an inspection step of inspecting a lowest density value of the groups of digital data;
   a setting step of setting an operating environment in which the lowest density value of the groups of digital data becomes a density value within a predetermined range; and
   a output step of inputting a subject image to the image sensor under the operating environment, converting analog data outputted from the image sensor, into digital data, and outputting image data expressive of the subject image on the basis of the resulting digital data.

9. The image reading method according to claim 8, wherein at the conversion step, the groups of analog data outputted as to a part of the photosensor elements arrayed rectilinearly in the image sensor which are discontinuously arrayed so as to interpose every predetermined number of remaining photosensor elements of the image sensor between the respectively adjacent ones of the discontinuously arrayed photosensor elements, are converted into the groups of digital data the number of which is smaller than that of the photosensor elements of the image sensor.

10. The image reading method according to claim 8, wherein
- the image sensor includes the plurality of photosensor elements which are arrayed in a plurality of rows forming parallel lines; and
- at the conversion step, the groups of analog data outputted as to a part of the photosensor elements of the image sensor which are discontinuously arrayed in each of the plurality of rows so as to interpose every predetermined number of remaining photosensor elements of the image sensor between the respectively adjacent ones of the discontinuously arrayed photosensor elements, are converted into those groups of digital data the number of which is smaller than that of the photosensor elements of the image sensor.

11. The image reading method according to claim 8, wherein the groups of digital data correspond to groups of mean values obtained every predetermined number of analog data.

12. The image reading method according to claim 8, wherein the groups of digital data correspond to groups of maximum values obtained every predetermined number of analog data.

13. The image reading method according to claim 8, wherein, at the setting step, the operating environment is set by adjusting amplification of the analog data which are outputted from the image sensor.

14. The image reading method according to claim 8, wherein at the setting step, the operating environment is set by adjusting an accumulation time of signal charges of the photosensor elements.

* * * * *